(12) United States Patent
Varghese et al.

(10) Patent No.: US 12,348,809 B2
(45) Date of Patent: *Jul. 1, 2025

(54) SYSTEMS AND METHODS FOR DETERMINING VIEWING OPTIONS FOR CONTENT BASED ON SCORING CONTENT DIMENSIONS

(71) Applicant: Verizon Patent and Licensing Inc., Basking Ridge, NJ (US)

(72) Inventors: Leena Varghese, Irving, TX (US); Mahalakshmi Velrajan, Chennai (IN); Sivanthikani Appadurai, Chennai (IN); Mukunda P. Raju, Bothell, WA (US); Sharon Gacek, Hillsborough, NJ (US); Robert Joseph Hewitt, London (GB); Vinodkrishnan Surianarayanan, Tamil Nadu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 9 days.

This patent is subject to a terminal disclaimer.

(21) Appl. No.: 18/414,806

(22) Filed: Jan. 17, 2024

(65) Prior Publication Data
US 2024/0155172 A1 May 9, 2024

Related U.S. Application Data

(63) Continuation of application No. 17/510,809, filed on Oct. 26, 2021, now Pat. No. 11,902,610.

(51) Int. Cl.
H04N 21/2665 (2011.01)
H04N 21/239 (2011.01)
(Continued)

(52) U.S. Cl.
CPC ..... H04N 21/2665 (2013.01); H04N 21/2393 (2013.01); H04N 21/251 (2013.01); H04N 21/4622 (2013.01); H04N 21/472 (2013.01)

(58) Field of Classification Search
CPC ........... H04N 21/2665; H04N 21/2393; H04N 21/251; H04N 21/4622; H04N 21/472
See application file for complete search history.

(56) References Cited

U.S. PATENT DOCUMENTS

2012/0317123 A1 12/2012 Green et al.
2014/0006951 A1 1/2014 Hunter
(Continued)

*Primary Examiner* — Nnenna N Ekpo

(57) ABSTRACT

A device may receive, from a user device, a content selection, and may receive metadata associated with the content. The device may determine viewing options, for viewing the content, based on the metadata associated with the content, and may identify dimensions of the content based on the viewing options. The device may calculate points for each of the dimensions of the content, and may assign the points for each of the dimensions of the content to generate weighted dimensions of the content. The device may associate the weighted dimensions of the content with the viewing options to generate weighted viewing options, and may rank the weighted viewing options to determine a primary viewing option, a secondary viewing option, and remaining viewing options. The device may provide the primary viewing option, the secondary viewing option, and the remaining viewing options to the user device, for display.

20 Claims, 11 Drawing Sheets

(51) Int. Cl.
*H04N 21/25* (2011.01)
*H04N 21/462* (2011.01)
*H04N 21/472* (2011.01)

(56) References Cited

U.S. PATENT DOCUMENTS

| | | |
|---|---|---|
| 2018/0144052 A1 | 5/2018 | Sayyadi-Harikandehei et al. |
| 2019/0164082 A1 | 5/2019 | Wu |
| 2019/0286673 A1 | 9/2019 | Sayyadi-Harikandehei et al. |
| 2020/0074321 A1* | 3/2020 | Chungapalli ......... G06F 16/735 |

* cited by examiner

SYSTEMS AND METHODS FOR DETERMINING VIEWING OPTIONS FOR CONTENT BASED ON SCORING CONTENT DIMENSIONS

RELATED APPLICATION

This application is a continuation of U.S. patent application Ser. No. 17/510,809, entitled "SYSTEMS AND METHODS FOR DETERMINING VIEWING OPTIONS FOR CONTENT BASED ON SCORING CONTENT DIMENSIONS," filed Oct. 26, 2021, which is incorporated herein by reference in its entirety.

BACKGROUND

Currently, an interface presented to users interacting with movie and television content of television entertainment products provided on a platform (e.g., a set-top box (STB)) is inefficient due to multiple available sources of the content. The available sources may be fragmented throughout the interface and not completely aggregated in a logical order, thereby complicating the user experience. Presenting content at a title level, rather than by content source, may enhances a usability and effectiveness of the interface. For example, if a movie title is airing live on a channel to which the user is subscribed, is available in an on-demand catalog, is available from a third party service, and is also available as a digital video recording (DVR), the presented viewing options may be limited and specific to the user's navigation steps. The interface may not be driven by a complete set of underlying logic and rules to aggregate all options at the title level and to display the options in an order that simplifies the user experience.

DETAILED DESCRIPTION OF EXAMPLE EMBODIMENTS

Figure 1A:
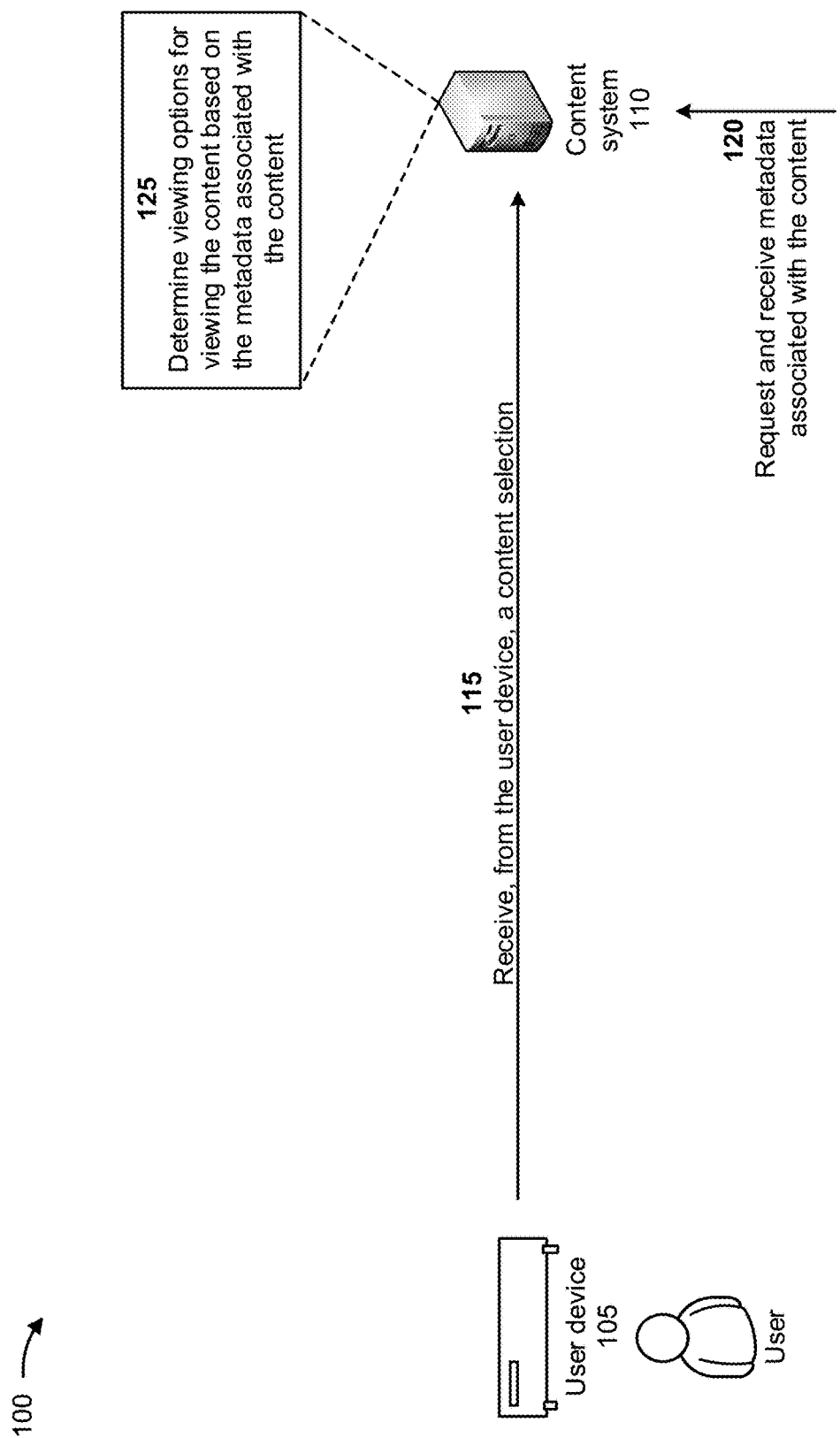
FIGS. 1A-1G are diagrams of an example associated with determining viewing options for content based on scoring content dimensions.

The following detailed description of example implementations refers to the accompanying drawings. The same reference numbers in different drawings may identify the same or similar elements.

Current techniques for presenting content information lack flexibility for a user to opt for a certain method for viewing content. Many times, the user is left to search for the content by utilizing a search option. Multiple steps may be required for the user to navigate to desired content provided via a desired viewing option (e.g., high definition, on demand, and/or the like) or the user may utilize the search option to attempt to locate the desired content provided via the desired viewing option. For example, the user may be presented with a user interface for selected content (e.g., a movie). The user interface may only provide a continue-to-watch option for high definition content, and may not provide any other viewing options for the selected content on other content sources (e.g., a premium channel, on demand, and/or the like). Thus, current techniques for presenting content information consumes computing resources (e.g., processing resources, memory resources, communication resources, and/or the like), networking resources, and/or other resources associated with presenting inferior content viewing options to users, providing inferior content viewing options to users, performing searches for content for DVRs and partner applications, handling user questions associated with locating content viewing options, user searching for alternate options for the content, and/or the like.

Some implementations described herein provide a content system that determines viewing options for content based on scoring content dimensions (e.g., dynamic dimensions of the content, static dimensions of the content, relationship dimensions of the content, and/or the like, as described below). For example, the content system may receive, from a user device, a content selection, and may receive metadata associated with the content. The content system may determine viewing options, for viewing the content, based on the metadata associated with the content, and may identify dimensions of the content based on the viewing options. The content system may calculate points for each of the dimensions of the content, and may assign the points for each of the dimensions of the content to generate weighted dimensions of the content. The content system may associate the weighted dimensions of the content with the viewing options to generate weighted viewing options, and may rank the weighted viewing options to determine a primary viewing option, a secondary viewing option, and remaining viewing options. The content system may provide the primary viewing option, the secondary viewing option, and the remaining viewing options to the user device, for display.

In this way, the content system determines viewing options for content based on scoring content dimensions. For example, the content system may unify content from different content sources so that different viewing options for the content (e.g., from the different content sources) may be presented to a user. The content system may generate scores for the different viewing options and may present a primary viewing option (e.g., associated with a greatest score), a secondary viewing option (e.g., associated with a second greatest score), and remaining viewing options to the user via a user interface. Thus, implementations described herein may conserve computing resources, networking resources, transportation resources, and other resources that would have otherwise been consumed by presenting inferior content viewing options to users, providing inferior content viewing options to users, performing searches for content for users, handling user questions associated with locating content viewing options, user searching for alternate options for the content, and/or the like.

FIGS. 1A-1G are diagrams of an example 100 associated with determining viewing options for content based on scoring content dimensions. As shown in FIGS. 1A-1G, example 100 includes a user device 105 (e.g., associated with a user) and a content system 110. Further details of the user device 105 and the content system 110 are provided elsewhere herein.

As shown in FIG. 1A, and by reference number 115, the content system 110 may receive, from the user device 105, a content selection. For example, the content system 110 may provide a user interface to the user device 105. The user device 105 may receive the user interface, and may cause the user interface to be displayed (e.g., via a television, via a display device, via the user device 105, and/or the like) to the user. The user interface may include a listing of multiple content and the user may utilize the user device 105 to select the content from the listing of the multiple content. Alternatively, or additionally, the user interface may include the content and a selection mechanism (e.g., a button, a link, and/or the like) from which the user may select the content via the user device 105.

As further shown in FIG. 1A, and by reference number 120, the content system 110 may request and receive metadata associated with the content. For example, the content system 110 may request and receive the metadata associated with the content from one or more data sources associated with the content system 110. In some implementations, the content system 110 may receive a cached portion of the metadata from a cache associated with the content system 110 when the cached portion is available. Alternatively, or additionally, the content system 110 may receive a non-cached portion of the metadata from a data structure (e.g., a metadata service) associated with the content system 110. Alternatively, or additionally, the content system 110 may receive an entitlement metadata portion of the metadata from an entitlement service. The entitlement metadata portion may include metadata associated with linear content, subscription video on demand (SVOD) content, advertising-based video on demand (AVOD) content, transactional video on demand (TVOD) content, free video on demand (FVOD) content, content stored in the user device 105 (e.g., recorded content), third party application content, and/or the like.

As further shown in FIG. 1A, and by reference number 125, the content system 110 may determine viewing options for viewing the content based on the metadata associated with the content. For example, the content system 110 may analyze the metadata associated with the content to identify information indicating viewing options for viewing the content. The content system 110 may determine the viewing options for viewing the content from the information identified in the metadata associated with the content. The viewing options may include one or more of a linear content viewing option, an SVOD content viewing option, an AVOD content viewing option, a TVOD content viewing option, a FVOD content viewing option, a content stored in the user device 105 viewing option (e.g., recorded content), an over-the-top (OTT) content viewing option (e.g., third party application content), and/or the like.

Figure 1B:
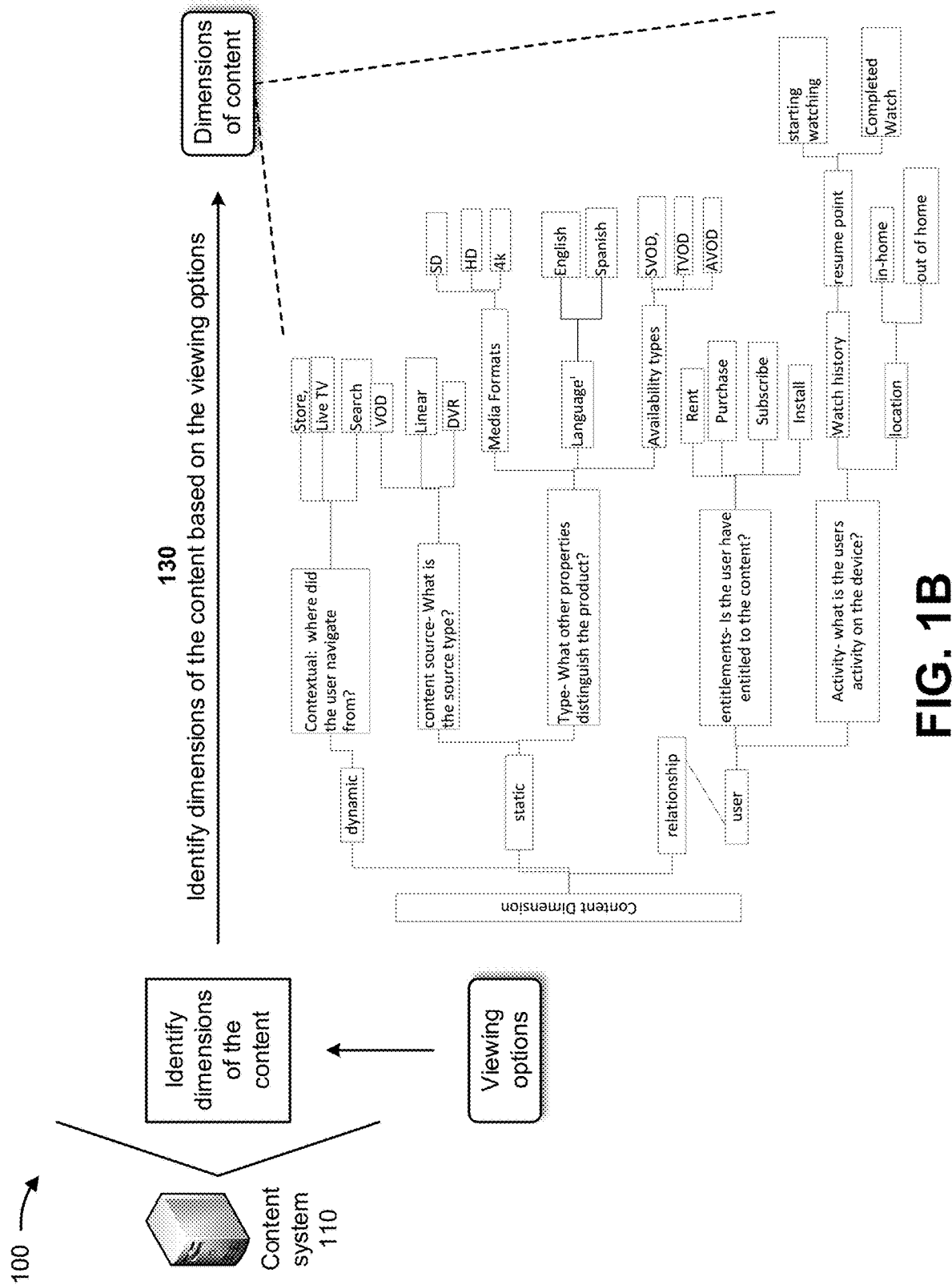

As shown in FIG. 1B, and by reference number 130, the content system 110 may identify dimensions of the content based on the viewing options. For example, the content system 110 may identify dynamic dimensions of the content, static dimensions of the content, relationship dimensions of the content, and/or the like, based on the viewing options. The dynamic dimensions may include dimensions associated with content navigation by the user device 105 and dimensions associated with content usage by the user device 105. For example, the dynamic dimensions may be associated with sources (e.g., a content store, live television, a search user interface, and/or the like) from which the user device 105 navigated to select the content. The static dimensions may include dimensions associated with the metadata. For example, the static dimensions may be associated with sources (e.g., video on demand (VOD) content, linear content, content stored on the user device 105, and/or the like) of the content; media formats of the content (e.g., standard definition format, high definition format, 4K resolution format, and/or the like); languages offered for the content (e.g., English, Spanish, French, and/or the like), availability types of the content (e.g., SVOD, TVOD, AVOD, FVOD, and/or the like); and/or the like. The relationship dimensions may include dimensions associated with content entitlements of the user device 105 (e.g., whether the user device 105 entitled to the content) and dimensions associated with activity of the user device 105. For example, the relationship dimensions may be associated with whether the user device 105 is entitled to rent, purchase, subscribe to, download, and/or the like the content; a watch history of the content (e.g., a resume point for watching the content, start watching the content from the beginning (watch history), or completed watching the content); a location for viewing the content (e.g., in home at a location of the user device 105, or out of home at a location of the user device 105); and/or the like.

Figure 1C:
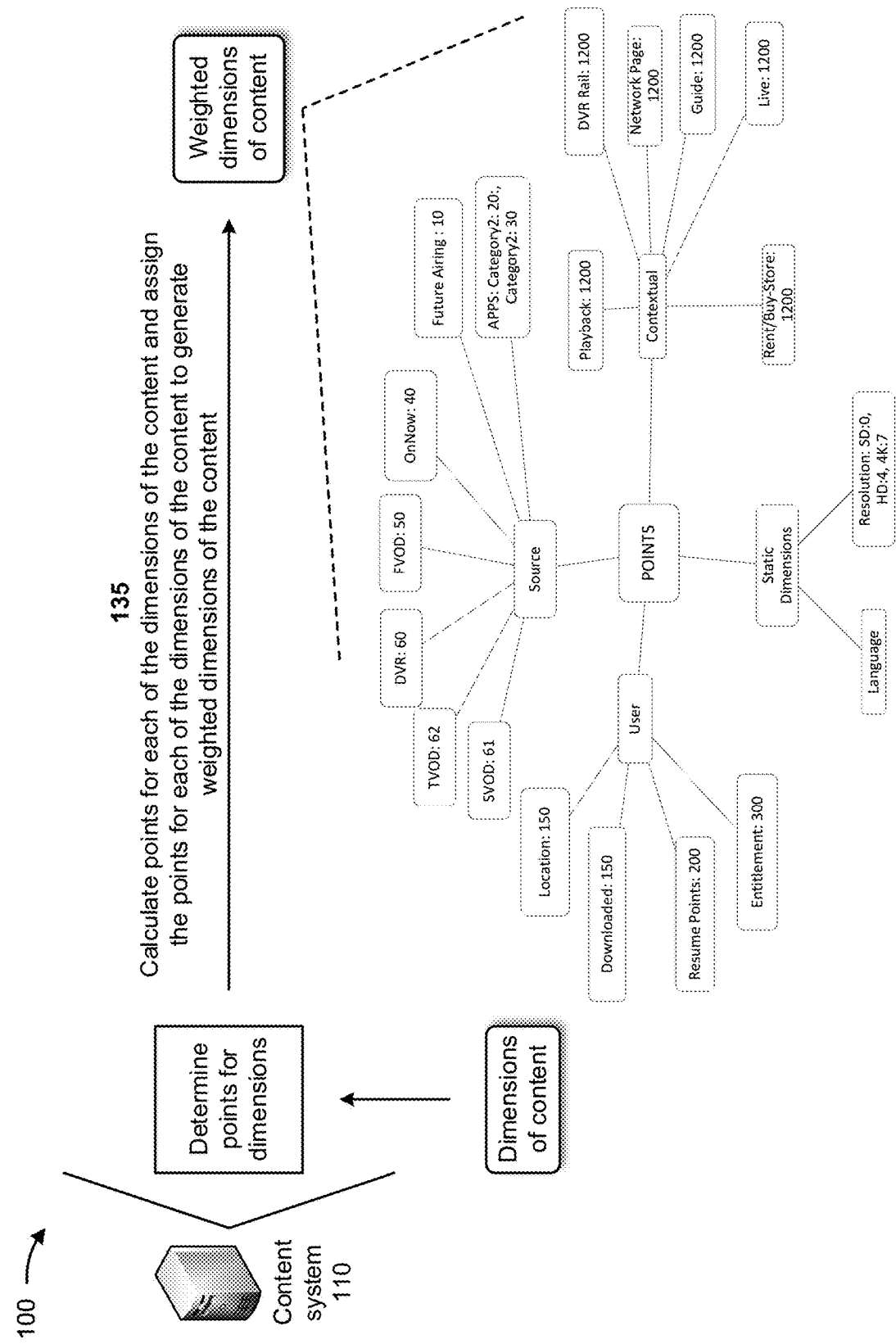

As shown in FIG. 1C, and by reference number 135, the content system 110 may calculate points for each of the dimensions of the content and may assign the points for each of the dimensions of the content to generate weighted dimensions of the content. For example, when calculating the points for each of the dimensions of the content, the content system 110 may calculate the points for each of the dimensions of the content based on processing the metadata with a model (e.g., a machine learning model). The content system 110 may utilize the model to set the points for each of the dimensions, to update dynamic sources (e.g., navigation by the user device 105, entitlements of the user device 105, and/or the like) associated with the dimensions, to update relationship sources associated with the dimensions, and/or the like. Further details of the machine learning model are provided below in connection with FIG. 2.

As further shown in FIG. 1C, the content system 110 may calculate the points based on sources of the content (e.g., SVOD sixty-one points, TVOD sixty-two points, stored on the user device 105 sixty points, FVOD fifty points, current linear content forty points, future linear content ten points, applications twenty points or thirty points, and/or the like); contextual information associated with the content (e.g., playback, stored on the user device 105, a network user interface, a content guide, live linear content, a content store for renting or buying the content, and/or the like, one thousand two hundred points); static dimensions of the content (e.g., language, resolution, and/or the like); information associated with the user device 105 (e.g., a location of the user device 105 one hundred and fifty points, whether the content is downloaded to the user device 105 one hundred and fifty points, whether the content is to be resumed two hundred points, entitlements of the user device 105 three hundred points, and/or the like); and/or the like.

In some implementations, when calculating the points for each of the dimensions of the content, the content system 110 may generate a points matrix for the dimensions of the content based on the metadata, and may calculate the points for each of the dimensions of the content based on the points matrix. When generating the points matrix for the dimensions of the content, the content system 110 may calculate base points associated with sources of the content; may calculate first bonus points associated with context of the content; and may calculate second bonus points associated with entitlements of the user device. The content system 110 may generate the points matrix and may calculate the points for each of the dimensions based on the base points, the first bonus points, and the second bonus points.

In some implementations, when assigning the points to each of the dimensions of the content to generate the weighted dimensions of the content, the content system 110 may assign the same value to each of the dimensions, and may multiply the value and the points, to generate the weighted dimensions of the content. For example, the content system 110 may assign a value of one (1) to each of the dimensions, and may determine that a first dimension is associated with fifty (50) points, a second dimension is associated with one hundred (100) points, and a third dimension is associated with seventy-five (75) points. In such example, a first weighted dimension may include a weighting value of fifty (50), a second weighted dimension may include a weighting value of one hundred (100), and a third weighted dimension may include a weighting value of seventy-five (75).

Figure 1D:
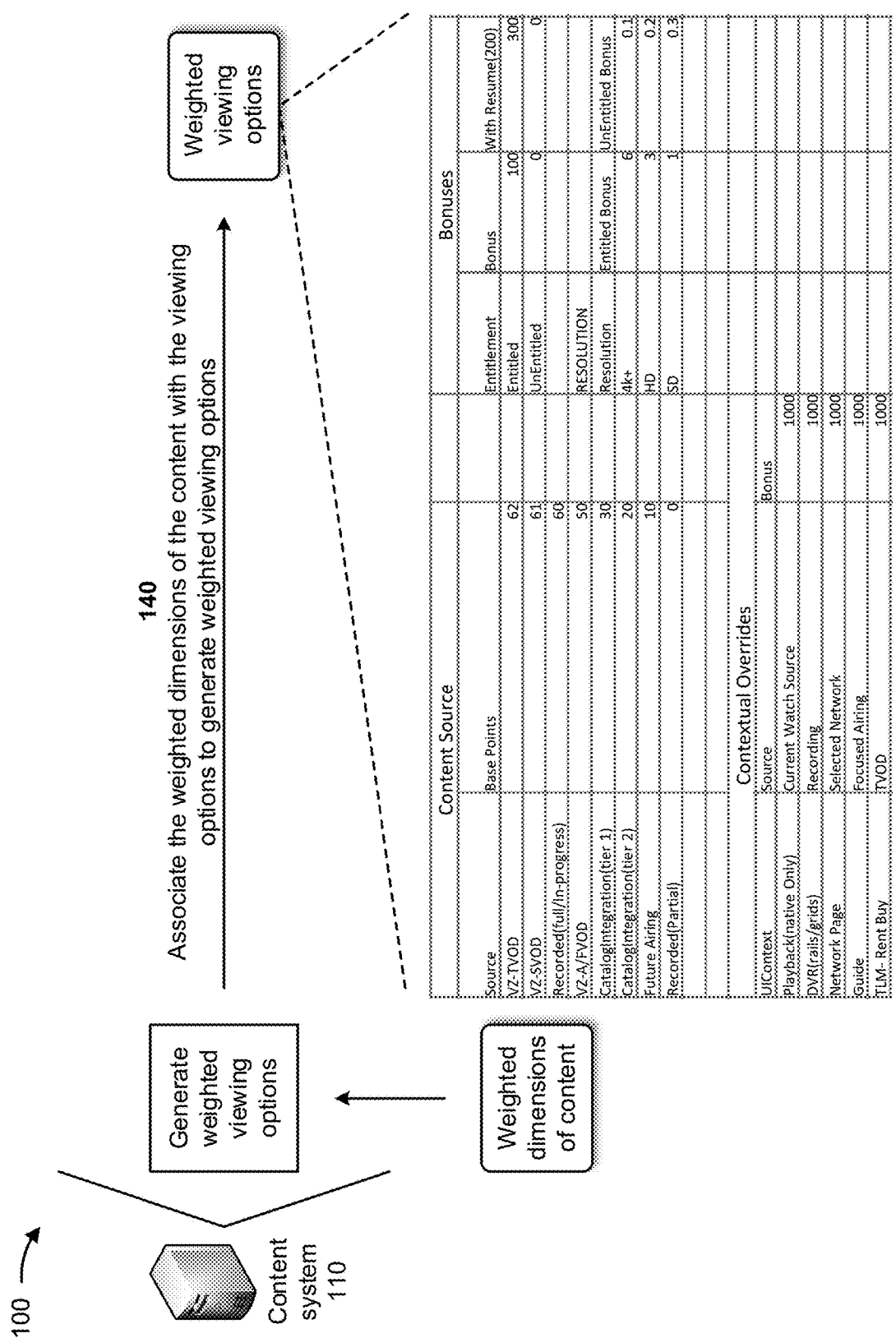

As shown in FIG. 1D, and by reference number 140, the content system 110 may associate the weighted dimensions of the content with the viewing options to generate weighted viewing options. In some implementations, the content system 110 may assign the same value to each of the viewing options, and may multiply the value and values of the weighted dimensions, for each of the viewing options, to generate the weighted viewing options. For example, the content system 110 may assign a value of one (1) to each of the viewing options and may determine that a first viewing option is associated with weighted dimensions with a total value of one-hundred and twenty-five (125), that a second viewing option is associated with weighted dimensions with a total value of one hundred and ten (110), and that a third viewing option is associated with weighted dimensions with a total value of seventy (70). In such an example, the first viewing option may include a weighting value of one-hundred and twenty-five (125), the second viewing option may include a weighting value of one hundred and ten (110), and the third viewing option may include a weighting value of seventy (70).

Figure 1E:
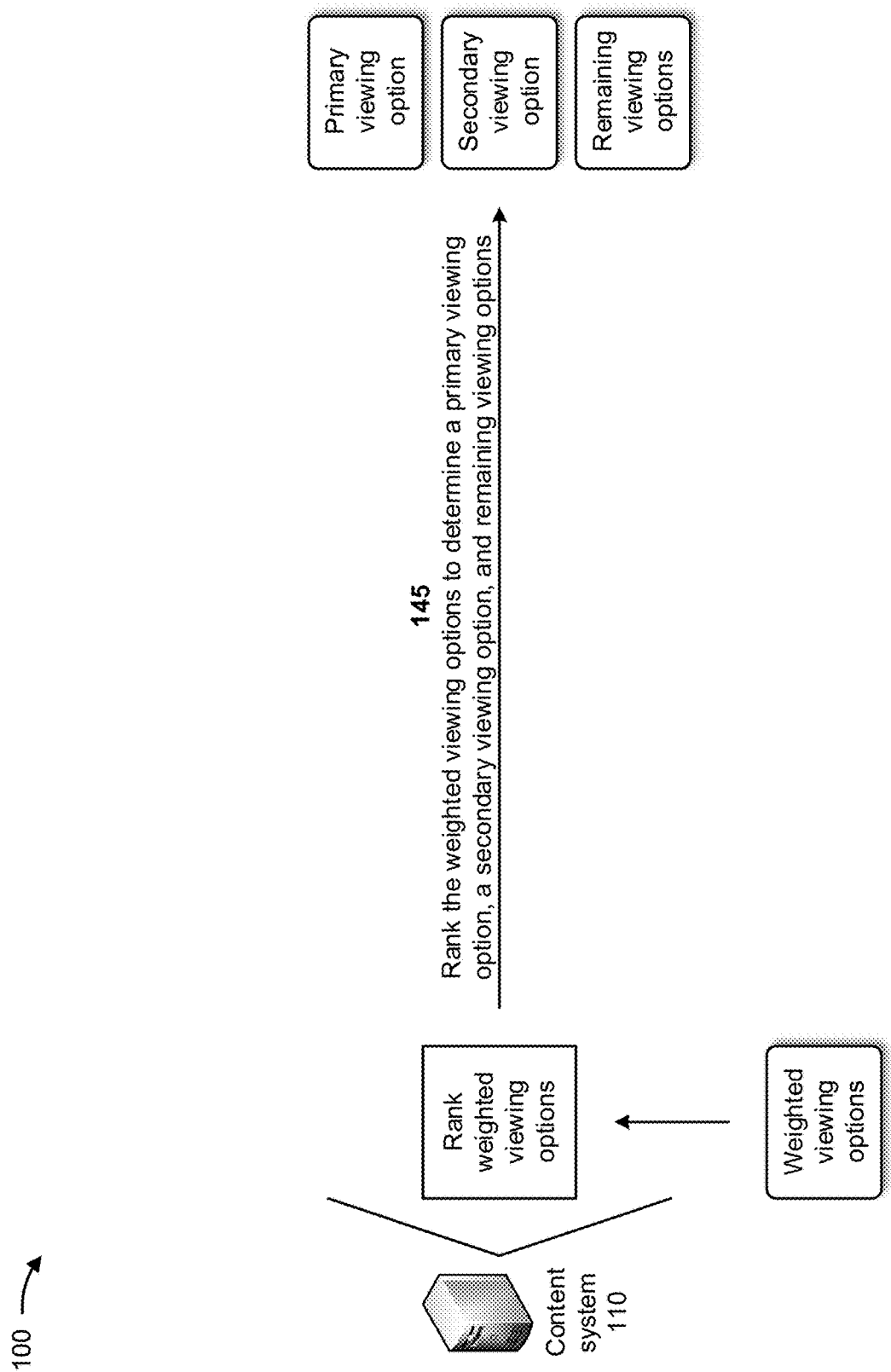

As shown in FIG. 1E, and by reference number 145, the content system 110 may rank the weighted viewing options to determine a primary viewing option, a secondary viewing option, and remaining viewing options. For example, when ranking the weighted viewing options to determine the primary viewing option, the secondary viewing option, and the remaining viewing options, the content system 110 may rank one of the weighted viewing options, with a greatest weighting value, as the primary viewing option. The content system 110 may rank another one of the weighted viewing options, with a second greatest weighting value, as the secondary viewing option, and may rank the weighted viewing options, other than the primary viewing option and the secondary viewing option, as the remaining viewing options in a ranked order based on the weighting values of the remaining viewing options.

In some implementations, the primary viewing option may include one of the weighted viewing options with a greatest weighting value that is determined based on an entitlement associated with the user device 105, a source type associated with the content, a format associated with the content, whether the user device 105 previously accessed the content, a context associated with the user device 105 relative to the content, and/or the like. In some implementations, the secondary viewing option may include one of the weighted viewing options with a second greatest weighting value that is determined based on the entitlement associated with the user device 105, the source type associated with the content, the format associated with the content, whether the user device 105 previously accessed the content, the context associated with the user device 105 relative to the content, and/or the like.

Figure 1F:
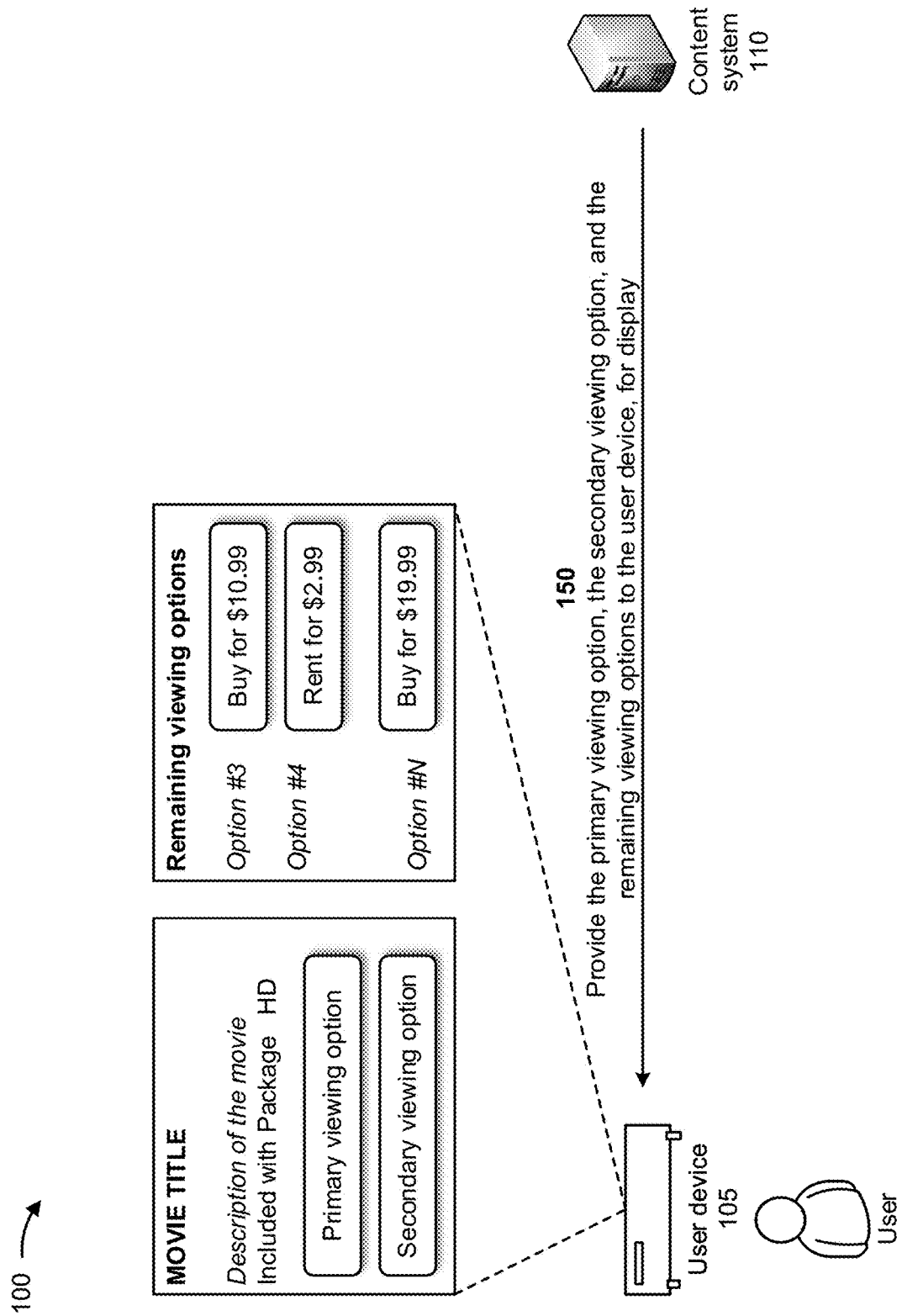

As shown in FIG. 1F, and by reference number 150, the content system 110 may provide the primary viewing option, the secondary viewing option, and the remaining viewing options to the user device 105, for display. For example, when providing the primary viewing option, the secondary viewing option, and the remaining viewing options to the user device 105, the content system may provide, to the user device 105, a first user interface that includes a first selection mechanism that identifies and is for selecting the primary viewing option, and a second selection mechanism that identifies and is for selecting the secondary viewing option. The user device 105 may receive the first user interface and may display the first user interface to the user. In some implementations, the first user interface may include a third selection mechanism that identifies the remaining viewing options. When selected by the user, the third selection mechanism may cause the content system 110 to provide, to the user device 105, a second user interface that includes information identifying the remaining viewing options. The user device 105 may receive the second user interface and may display the second user interface to the user.

In some implementations, the content system 110 may receive, from the user device 105, a selection of the primary viewing option via the first selection mechanism of the first user interface. The content system 110 may cause the content to be provided, to the user device 105 and via the primary viewing option, based on the selection of the primary viewing option. In some implementations, the content system 110 may receive, from the user device 105, a selection of the secondary viewing option via the second selection mechanism of the first user interface. The content system 110 may cause the content to be provided, to the user device 105 and via the secondary viewing option, based on the selection of the secondary viewing option. In some implementations, the content system 110 may receive, from the user device 105, a selection of one of the remaining viewing options via the second user interface. The content system 110 may cause the content to be provided, to the user device 105 and via the one of the remaining viewing options, based on the selection of the one of the remaining viewing options.

Implementations described herein may be utilized for content viewing services provided via a television service provider, an Internet service provider, a telecommunications service provider, a content streaming provider, and/or the like. Furthermore, implementations described herein may be utilized with any content search and discovery application to reduce the search times associated with searching for content and reduce navigations for content. Points may be reassigned different values for different content search and discovery application types.

In some implementations, the content system 110 may retrain the machine learning model based on the primary viewing option, the secondary viewing option, and the remaining viewing options. The content system 110 may utilize the primary viewing option, the secondary viewing option, and the remaining viewing options for retraining the machine learning model, thereby increasing the quantity of training data available for training the machine learning model. Accordingly, the content system 110 may conserve computing resources associated with identifying, obtaining, and/or generating historical data for training the machine learning model relative to other systems for identifying, obtaining, and/or generating historical data for training machine learning models.

Figure 1G:
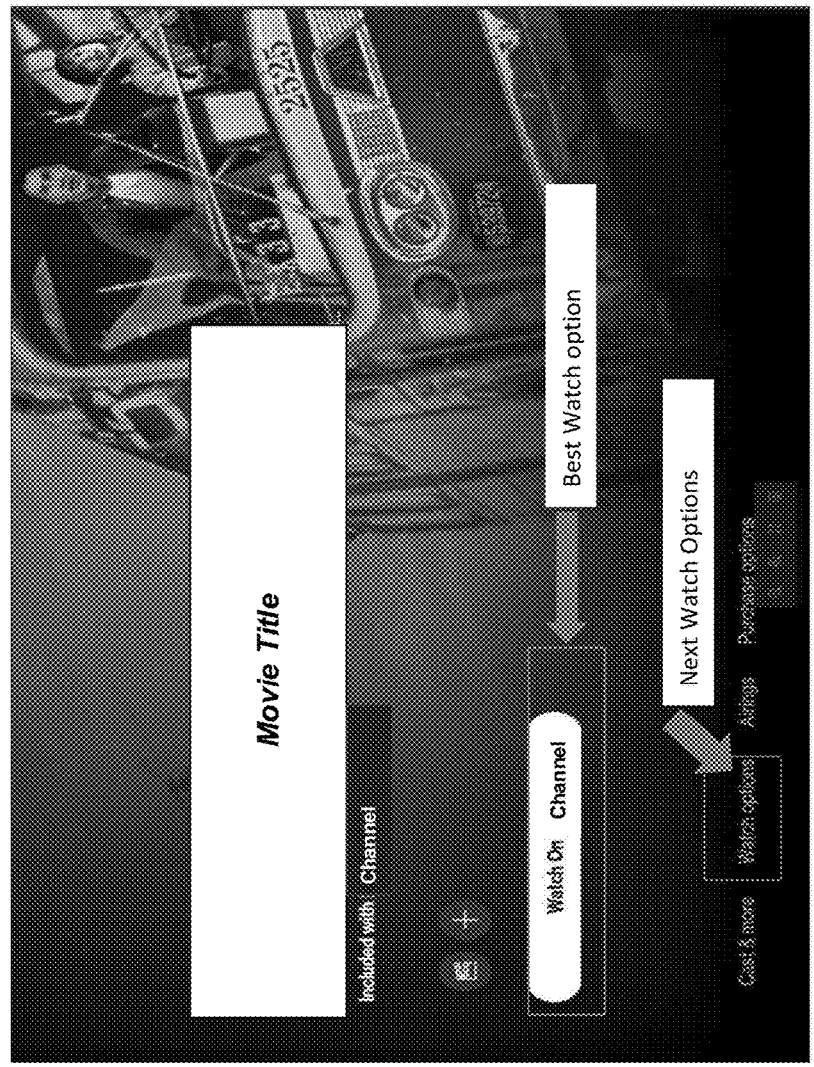

FIG. 1G is a diagram of an example user interface that may provided to the user device 105 and displayed to a user by the user device 105. As shown, the user interface may include a includes a first selection mechanism that identifies and is for selecting a primary viewing option (e.g., the best watch option), and a second selection mechanism that identifies the remaining viewing options (e.g., the next watch options).

In this way, the content system 110 determines viewing options for content based on scoring content dimensions. For example, the content system 110 may unify content from different content sources so that different viewing options for the content (e.g., from the different content sources) may be presented to a user. The content system 110 may generate scores for the different viewing options and may present a primary viewing option (e.g., associated with a greatest score), a secondary viewing option (e.g., associated with a second greatest score), and remaining viewing options to the user via a user interface. Thus, implementations described herein may conserve computing resources, networking resources, transportation resources, and other resources that would have otherwise been consumed by presenting inferior content viewing options to users, providing inferior content viewing options to users, performing searches for content for users, handling user questions associated with locating content viewing options, user searching for alternate options for the content, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
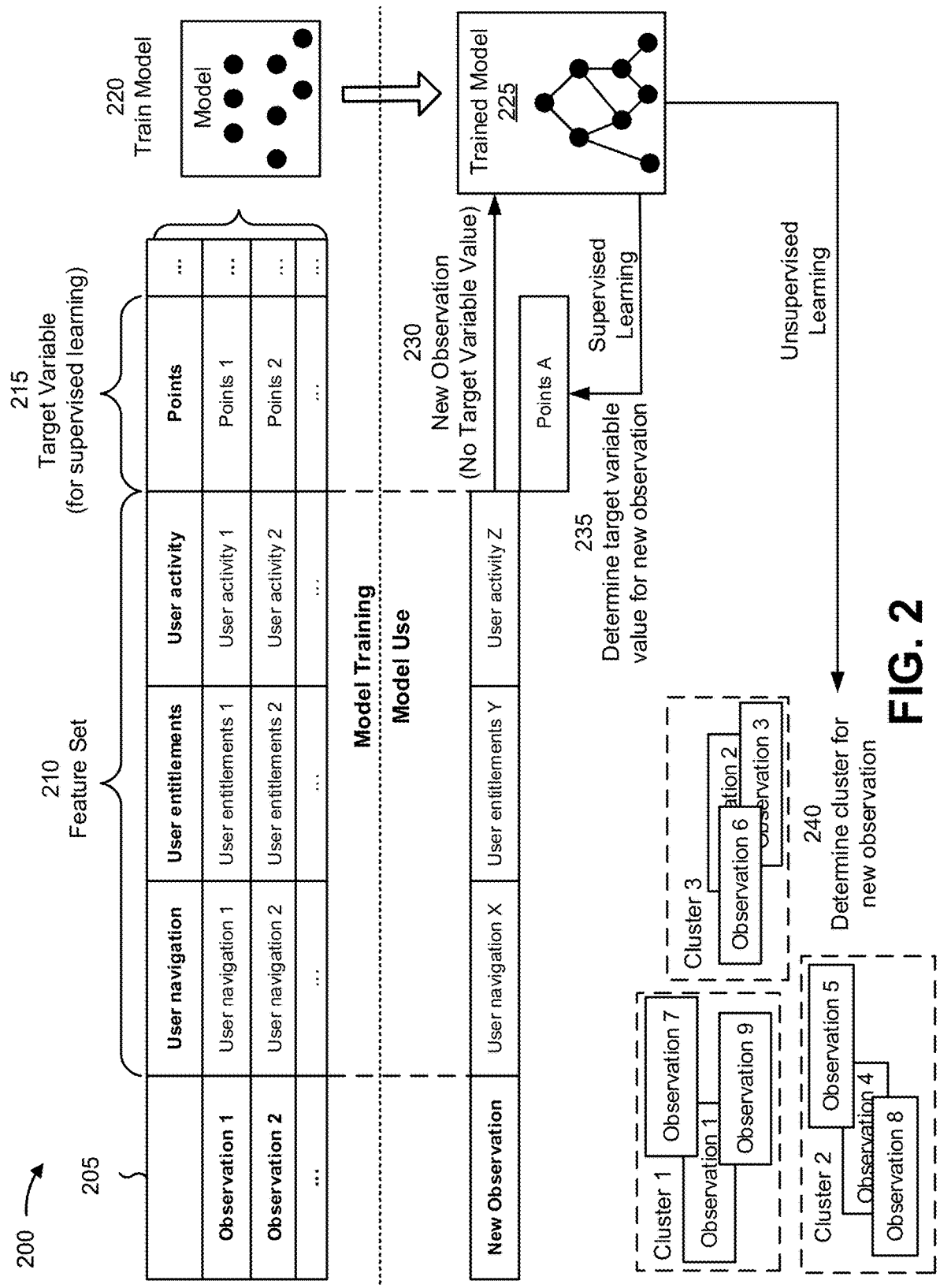
FIG. 2 is a diagram illustrating an example of training and using a machine learning model in connection with determining viewing options for content based on scoring content dimensions.

FIG. 2 is a diagram illustrating an example 200 of training and using a machine learning model in connection with determining viewing options for content based on scoring content dimensions. The machine learning model training and usage described herein may be performed using a machine learning system. The machine learning system may include or may be included in a computing device, a server, a cloud computing environment, and/or the like, such as the content system 110 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the content system 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the content system 110. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of user navigation, a second feature of user entitlements, a third feature of user activity, and so on. As shown, for a first observation, the first feature may have a value of user navigation 1, the second feature may have a value of user entitlements 1, the third feature may have a value of user activity 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is points, which has a value of points 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of user navigation X, a second feature of user entitlements Y, a third feature of user activity Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of points A for the target variable of the points for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a user navigation cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a user entitlements cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determine viewing options for content based on scoring content dimensions. The machine learning system enables recognition and/or identification of tens, hundreds, thousands, or millions of features and/or feature values for tens, hundreds, thousands, or millions of observations, thereby increasing accuracy and consistency and reducing delay associated with determining viewing options for content based on scoring content dimensions relative to requiring computing resources to be allocated for tens, hundreds, or thousands of operators to manually determine viewing options for content based on scoring content dimensions.

As indicated above, FIG. 2 is provided as an example. Other examples may differ from what is described in connection with FIG. 2.

Figure 3:
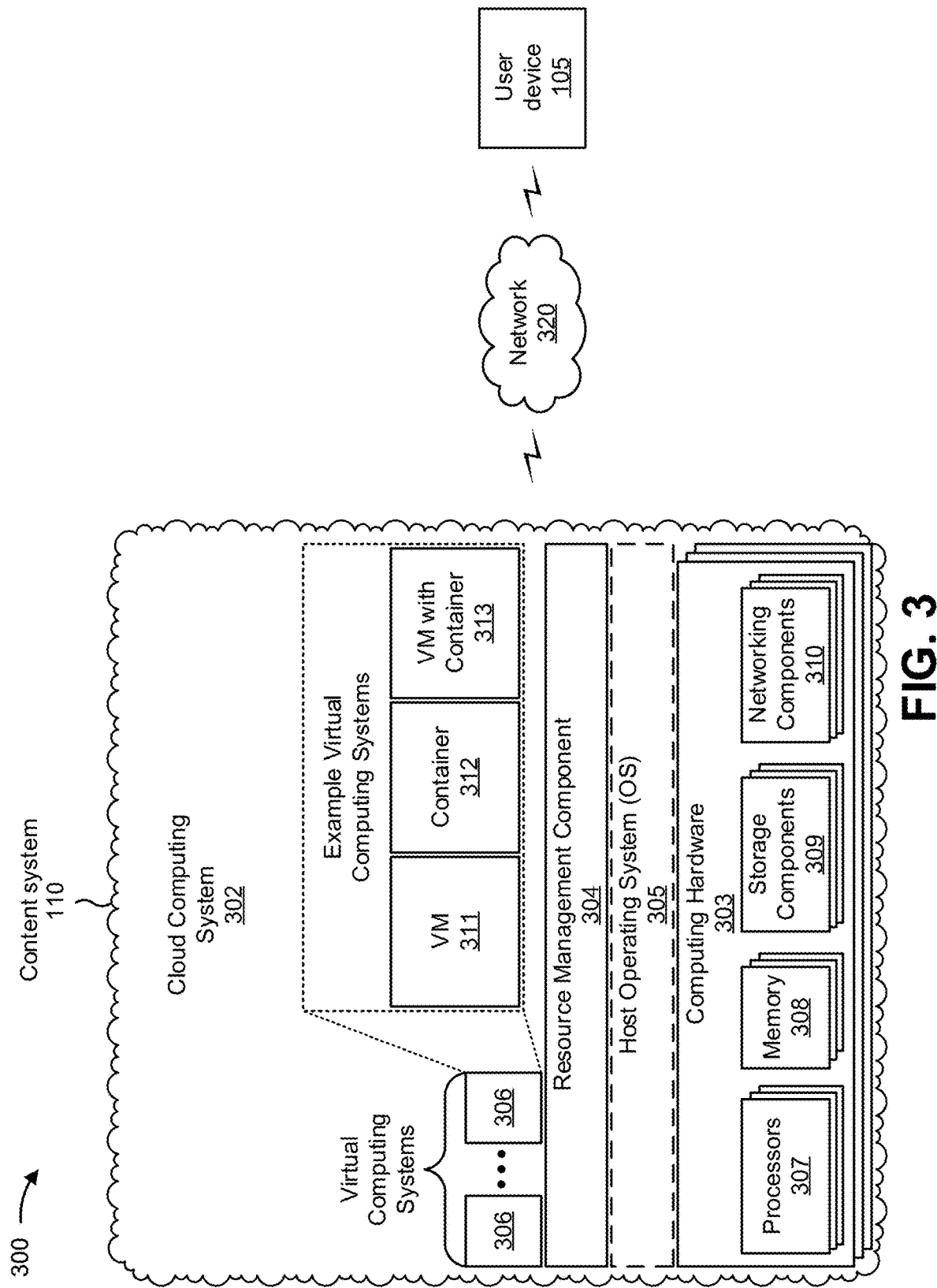
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include the content system 110, which may include one or more elements of and/or may execute within a cloud computing system 302. The cloud computing system 302 may include one or more elements 303-313, as described in more detail below. As further shown in FIG. 3, environment 300 may include the user device 105 and/or a network 320. Devices and/or elements of environment 300 may interconnect via wired connections and/or wireless connections.

The user device 105 includes one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, or a hybrid environment 313 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the content system 110 may include one or more elements 303-313 of the cloud computing system 302, may execute within the cloud computing system 302, and/or may be hosted within the cloud computing system 302, in some implementations, the content system 110 may not be cloud-based (e.g., may be implemented outside of a cloud computing system) or may be partially cloud-based. For example, the content system 110 may include one or more devices that are not part of the cloud computing system 302, such as the device 400 of FIG. 4, which may include a standalone server or another type of computing device. The content system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
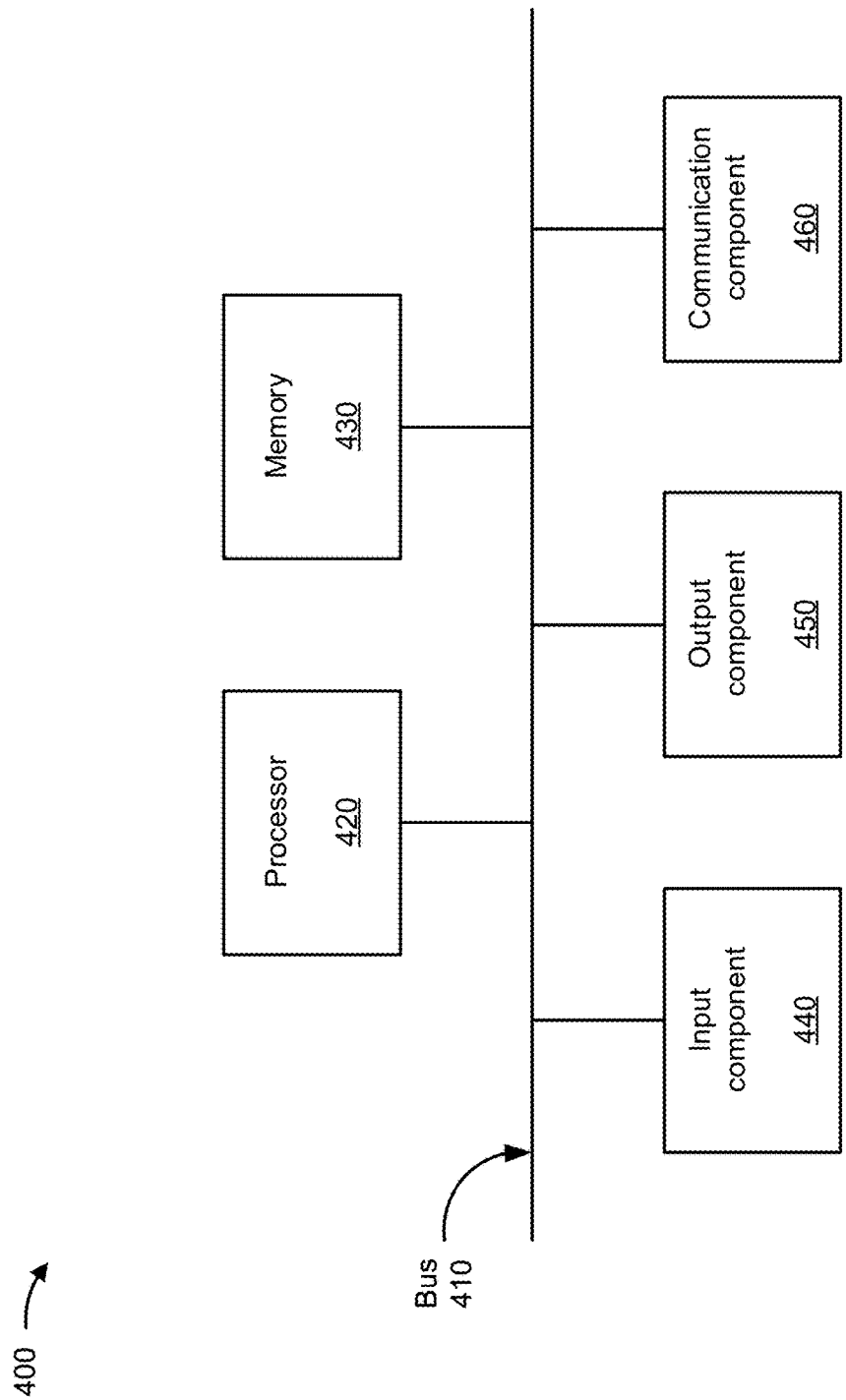
FIG. 4 is a diagram of example components of one or more devices of FIG. 3.

FIG. 4 is a diagram of example components of a device 400, which may correspond to the user device 105 and/or the content system 110. In some implementations, the user device 105 and/or the content system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of the device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, and/or an actuator. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, and/or an antenna.

The device 400 may perform one or more processes described herein. For example, a non-transitory computer-readable medium (e.g., the memory 430) may store a set of instructions (e.g., one or more instructions, code, software code, and/or program code) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
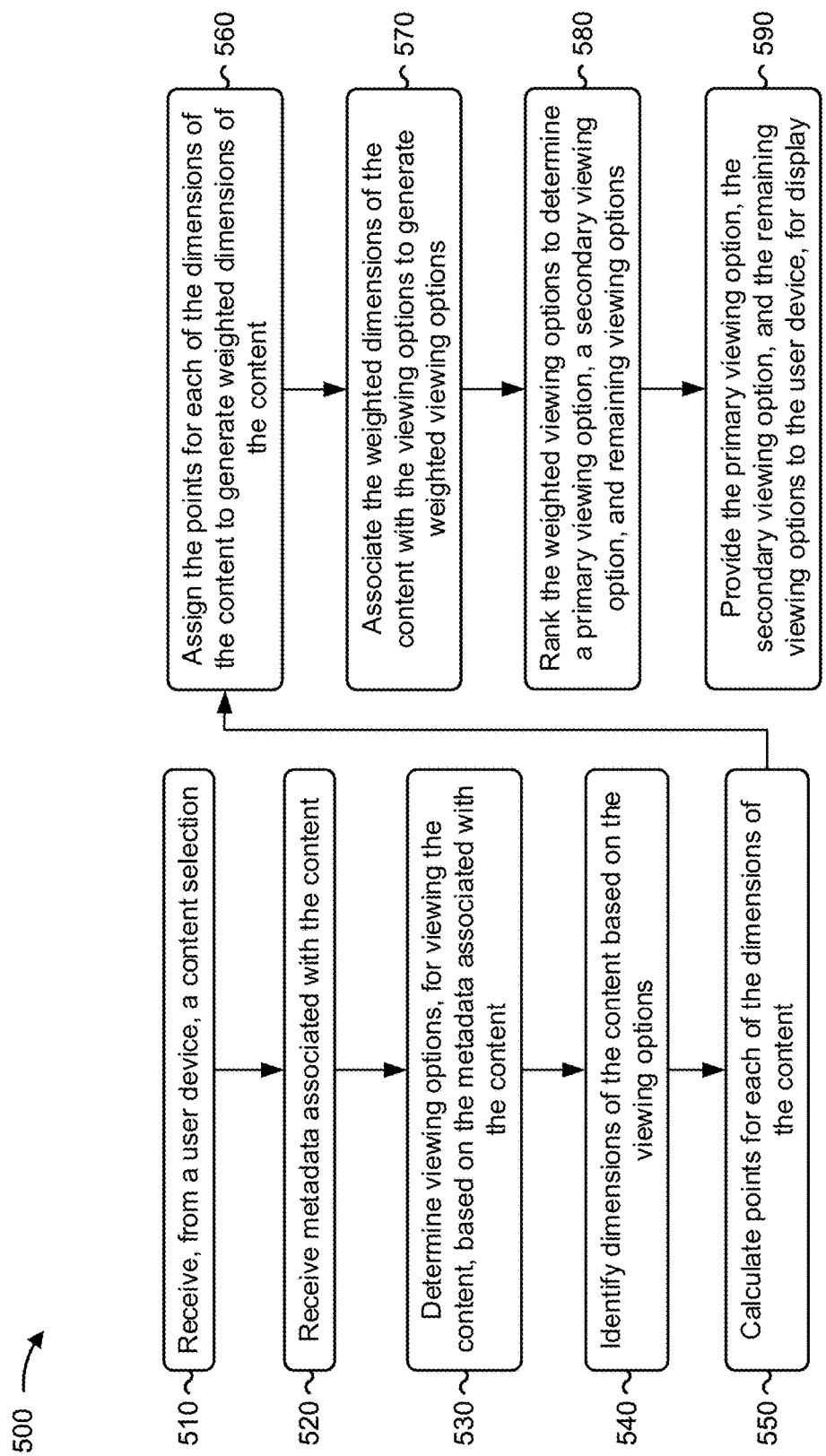
FIG. 5 is a flowchart of an example process for determining viewing options for content based on scoring content dimensions.

FIG. 5 is a flowchart of an example process 500 for determining viewing options for content based on scoring content dimensions. In some implementations, one or more process blocks of FIG. 5 may be performed by a device (e.g., the content system 110). In some implementations, one or more process blocks of FIG. 5 may be performed by another device or a group of devices separate from or including the device, such as a user device (e.g., the user device 105). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving, from a user device, a content selection (block 510). For example, the device may receive, from a user device, a content selection, as described above.

As further shown in FIG. 5, process 500 may include receiving metadata associated with the content (block 520). For example, the device may receive metadata associated with the content, as described above. In some implementations, receiving the metadata includes providing, to one or more data structures, a request for the metadata, and receiving the metadata from the one or more data structures based on the request. In some implementations, receiving the metadata associated with the content includes receiving a cached portion of the metadata from a cache, receiving a non-cached portion of the metadata from a data structure, and receiving an entitlement metadata portion of the metadata from an entitlement service.

As further shown in FIG. 5, process 500 may include determining viewing options, for viewing the content, based on the metadata associated with the content (block 530). For example, the device may determine viewing options, for viewing the content, based on the metadata associated with the content, as described above.

As further shown in FIG. 5, process 500 may include identifying dimensions of the content based on the viewing options (block 540). For example, the device may identify dimensions of the content based on the viewing options, as described above. In some implementations, the dimensions of the content include one or more of a dimension associated with content navigation by the user device, a dimension associated with content usage by the user device, a dimension associated with the metadata, a dimension associated with content entitlements of the user device, or a dimension associated with activity of the user device.

As further shown in FIG. 5, process 500 may include calculating points for each of the dimensions of the content (block 550). For example, the device may calculate points for each of the dimensions of the content, as described above. In some implementations, calculating the points for each of the dimensions of the content includes calculating the points for each of the dimensions of the content based on processing the metadata with a machine learning model. In some implementations, calculating the points for each of the dimensions of the content includes calculating base points associated with sources of the content; calculating first bonus points associated with context of the content; calculating second bonus points associated with entitlements of the user device; and calculating the points for each of the dimensions based on the base points, the first bonus points, and the second bonus points.

In some implementations, calculating the points for each of the dimensions of the content includes generating a points matrix for the dimensions of the content based on the metadata, and calculating the points for each of the dimensions of the content based on the points matrix.

As further shown in FIG. 5, process 500 may include assigning the points for each of the dimensions of the content to generate weighted dimensions of the content (block 560). For example, the device may assign the points for each of the dimensions of the content to generate weighted dimensions of the content, as described above.

As further shown in FIG. 5, process 500 may include associating the weighted dimensions of the content with the viewing options to generate weighted viewing options (block 570). For example, the device may associate the weighted dimensions of the content with the viewing options to generate weighted viewing options, as described above.

As further shown in FIG. 5, process 500 may include ranking the weighted viewing options to determine a primary viewing option, a secondary viewing option, and remaining viewing options (block 580). For example, the device may rank the weighted viewing options to determine a primary viewing option, a secondary viewing option, and remaining viewing options, as described above. In some implementations, ranking the weighted viewing options to determine the primary viewing option, the secondary viewing option, and the remaining viewing options includes ranking one of the weighted viewing options, with a greatest weighting value, as the primary viewing option; ranking another one of the weighted viewing options, with a second greatest weighting value, as the secondary viewing option; and ranking the remaining weighted viewing options, as the remaining viewing options in a ranked order.

In some implementations, the primary viewing option is one of the weighted viewing options with a greatest weighting value that is determined based on one or more of an entitlement associated with the user device, a source type associated with the content, a format associated with the content, whether the user device previously accessed the content, or a context associated with the user device relative to the content.

As further shown in FIG. 5, process 500 may include providing the primary viewing option, the secondary viewing option, and the remaining viewing options to the user device, for display (block 590). For example, the device may provide the primary viewing option, the secondary viewing option, and the remaining viewing options to the user device, for display, as described above. In some implementations, providing the primary viewing option, the secondary viewing option, and the remaining viewing options to the user device includes providing, to the user device, a first user interface that includes a first selection mechanism identifying and for selecting the primary viewing option, and a second selection mechanism identifying and for selecting the secondary viewing option; and providing, to the user device, a second user interface that includes information identifying the remaining viewing options.

In some implementations, process 500 includes receiving, from the user device, a selection of the primary viewing option, and causing the content to be provided, to the user device and via the primary viewing option, based on the selection of the primary viewing option.

In some implementations, process 500 includes receiving, from the user device, a selection of the secondary viewing option, and causing the content to be provided, to the user device and via the secondary viewing option, based on the selection of the secondary viewing option.

In some implementations, process 500 includes receiving, from the user device, a selection of one of the remaining viewing options, and causing the content to be provided, to the user device and via the one of the remaining viewing options, based on the selection of the one of the remaining viewing options.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device and from one or more data structures, metadata associated with selected content;
   determining, by the device and based on the metadata, viewing options for viewing the selected content;
   ranking, by the device, the viewing options to determine a primary viewing option and a secondary viewing option;
   providing, by the device, to a user device, and based on determining the primary viewing option and the secondary viewing option, a user interface to cause the user interface to be displayed,
      wherein the user interface includes:
         a first selection mechanism that identifies and is for selecting the primary viewing option, and
         a second selection mechanism that identifies and is for selecting the secondary viewing option; and
   causing, by the device and based on interaction with the first selection mechanism or the second selection mechanism, the selected content to be provided to the user device via the primary viewing option or the secondary viewing option.

2. The method of claim 1, wherein receiving the metadata comprises:
   providing, to the one or more data structures, a request for the metadata; and
   receiving the metadata from the one or more data structures based on the request.

3. The method of claim 1, wherein the viewing options include:
   a linear content viewing option,
   a subscription video on demand (SVOD) content viewing option,
   an advertising-based video on demand (AVOD) content viewing option,
   a transactional video on demand (TVOD) content viewing option,
   a free video on demand (FVOD) content viewing option,
   a recorded content viewing option, or
   a third party application content viewing option.

4. The method of claim 1, comprising:
   identifying dimensions of the selected content based on the metadata,
      wherein the dimensions are associated with one or more of:
         sources of the selected content,
         media formats of the selected content,
         languages offered for the selected content, or
         availability types of the selected content; and
   wherein ranking the viewing options is based on the dimensions.

5. The method of claim 1, comprising:
   identifying dimensions of the selected content based on the viewing options,
      wherein the dimensions are associated with one or more of:
         whether the user device is entitled to rent, purchase, subscribe to,
         or download the selected content,
         a watch history of the selected content, or
         a location for viewing the selected content; and
   wherein ranking the viewing options is based on the dimensions.

6. The method of claim 1, further comprising:
   identifying dimensions of the selected content based on the viewing options,
      wherein the dimensions are associated with one or more of:
         content navigation by the user device, or
         content usage by the user device; and
   wherein ranking the viewing options is based on the dimensions.

7. The method of claim 1, wherein the device is associated with a television service provider, an Internet service provider, a telecommunications service provider, or a content streaming provider.

8. A device, comprising:
one or more processors configured to:
receive metadata associated with selected content;
determine viewing options, for viewing the selected content, based on the metadata;
rank the viewing options to determine a primary viewing option, a secondary viewing option, and one or more remaining viewing options;
provide, to a user device and based on determining the primary viewing option, the secondary viewing option, and the one or more remaining viewing options, a user interface to cause the user interface to be displayed,
wherein the user interface includes:
a first selection mechanism that identifies and is for selecting the primary viewing option,
a second selection mechanism that identifies and is for selecting the secondary viewing option, and
a third selection mechanism that identifies and is for selecting the one or more remaining viewing options; and
cause, based on interaction with the first selection mechanism, the second selection mechanism, or the third selection mechanism, the selected content to be provided to the user device via the primary viewing option, the secondary viewing option, or one of the one or more remaining viewing options.

9. The device of claim 8, wherein the one or more processors are further configured to:
receive, from the user device, a selection of the primary viewing option; and
cause the selected content to be provided, to the user device and via the primary viewing option, based on the selection of the primary viewing option.

10. The device of claim 8, wherein the one or more processors are further configured to:
receive, from the user device, a selection of the secondary viewing option; and
cause the selected content to be provided, to the user device and via the secondary viewing option, based on the selection of the secondary viewing option.

11. The device of claim 8, wherein the one or more processors are further configured to:
receive, from the user device, a selection of one of the one or more remaining viewing options; and
cause the selected content to be provided, to the user device and via the one of the one or more remaining viewing options, based on the selection of the one of the one or more remaining viewing options.

12. The device of claim 8, wherein the one or more processors, to receive the metadata, are configured to:
receive a cached portion of the metadata from a cache;
receive a non-cached portion of the metadata from a data structure; and
receive an entitlement metadata portion of the metadata from an entitlement service.

13. The device of claim 8, wherein the one or more processors are further configured to:
identify dimensions of the selected content based on the viewing options; and
wherein the one or more processors, to rank the viewing options, are configured to:
rank the viewing options based on the dimensions.

14. The device of claim 13, wherein the dimensions include at least one of static dimensions, dynamic dimensions, or relationship dimensions.

15. A non-transitory computer-readable medium storing a set of instructions, the set of instructions comprising:
one or more instructions that, when executed by one or more processors of a device, cause the device to:
receive metadata associated with selected content;
determine viewing options, for viewing the selected content, based on the metadata;
determine, from the viewing options, a primary viewing option and a secondary viewing option;
provide, to a user device, a user interface to cause the user interface to be displayed,
wherein the user interface includes:
a first selection mechanism that identifies and is for selecting the primary viewing option, and
a second selection mechanism that identifies and is for selecting the secondary viewing option; and
cause, based on interaction with the first selection mechanism or the second selection mechanism, the selected content to be provided to the user device via the primary viewing option or the secondary viewing option.

16. The non-transitory computer-readable medium of claim 15, wherein selected content includes linear content, subscription video on demand (SVOD) content, advertising-based video on demand (AVOD) content, a transactional video on demand (TVOD) content, a free video on demand (FVOD) content, recorded content, or third party application content.

17. The non-transitory computer-readable medium of claim 15, wherein the one or more instructions further cause the device to:
identify dimensions of the selected content based on the metadata,
wherein the dimensions are associated with one or more of:
sources of the selected content,
media formats of the selected content,
languages offered for the selected content, or
availability types of the selected content; and
wherein the one or more instructions, when determining the primary viewing option and the secondary viewing option, determine the primary viewing option and the secondary viewing option based on the dimensions.

18. The non-transitory computer-readable medium of claim 15, wherein the primary viewing options is associated with a ranking that is higher than a ranking of the secondary viewing option.

19. The non-transitory computer-readable medium of claim 15, wherein the one or more instructions further cause the device to:
receive, from the user device, a selection of the primary viewing option; and
cause the selected content to be provided, to the user device and via the primary viewing option, based on the selection of the primary viewing option.

20. The non-transitory computer-readable medium of claim 15, wherein the one or more instructions further cause the device to:
receive, from the user device, a selection of the secondary viewing option; and
cause the selected content to be provided, to the user device and via the secondary viewing option, based on the selection of the secondary viewing option.

* * * * *